United States Patent
Pether et al.

(10) Patent No.: US 6,744,428 B1
(45) Date of Patent: Jun. 1, 2004

(54) BLOCK MOVE ENGINE WITH MACROBLOCK ADDRESSING MODES

(75) Inventors: David N. Pether, Wokingham (GB); Martin J. Ratcliffe, Bracknell (GB)

(73) Assignee: LSI Logic Corporation, Milpitas, CA (US)

( * ) Notice: Subject to any disclaimer, the term of this patent is extended or adjusted under 35 U.S.C. 154(b) by 314 days.

(21) Appl. No.: 09/878,594

(22) Filed: Jun. 11, 2001

(51) Int. Cl.[7] ............................. G09G 5/00; G09G 5/397
(52) U.S. Cl. ....................... 345/204; 345/213; 345/546
(58) Field of Search ................................. 345/204, 213, 345/603, 546; 348/469, 474, 475, 426.1

(56) References Cited

U.S. PATENT DOCUMENTS 5,874,995 A * 2/1999 Naimpally et al. .... 375/240.25
5,903,310 A * 5/1999 Finotello et al. ....... 375/240.25
6,198,477 B1 * 3/2001 Kurtze et al. ............ 715/500.1

* cited by examiner

Primary Examiner—Richard Hjerpe
Assistant Examiner—M. Fatahi Yar
(74) Attorney, Agent, or Firm—Christopher P. Maiorana, P.C.

(57) ABSTRACT

An apparatus comprising a first circuit and a second circuit. The first circuit may be configured to generate an address signal in response to (i) a first ramp signal, (ii) a second ramp signal, and (iii) a format signal. The second circuit may be configured to generate the first and second ramp signals in response to a one or more control signals. The address signal may support a raster format when the format signal is in a first state and may support a macroblock format when the format signal is in a second state.

19 Claims, 2 Drawing Sheets

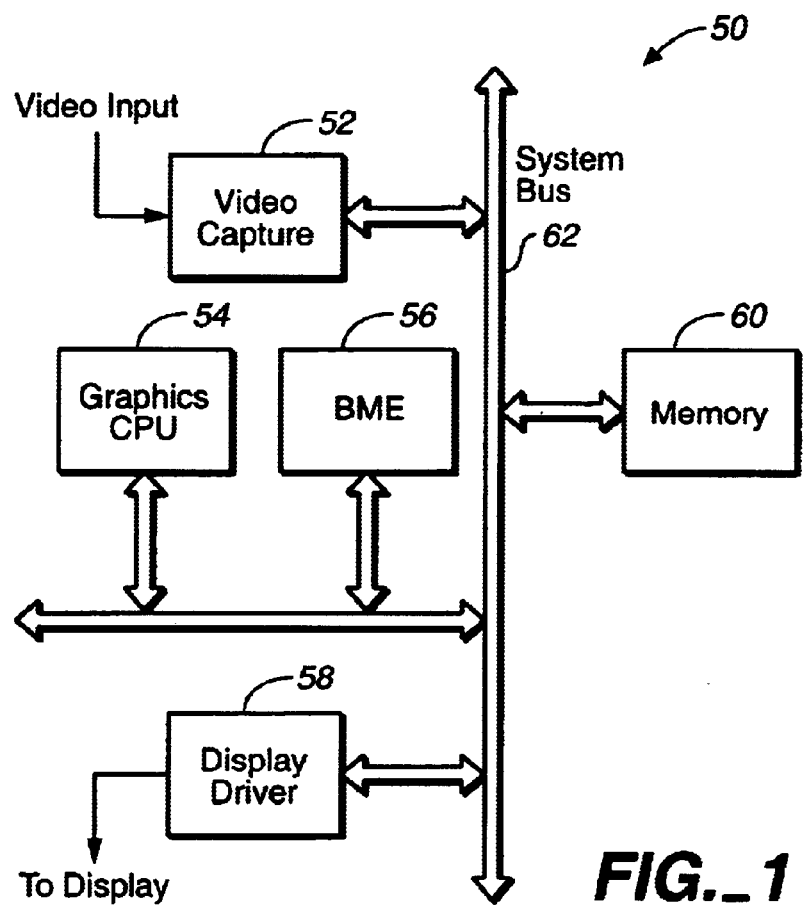
FIG._1
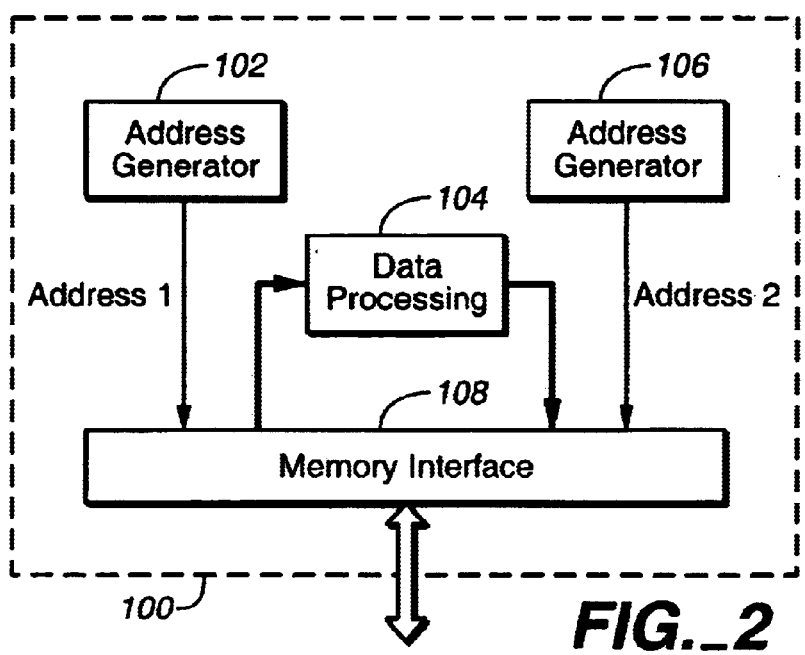
FIG._2

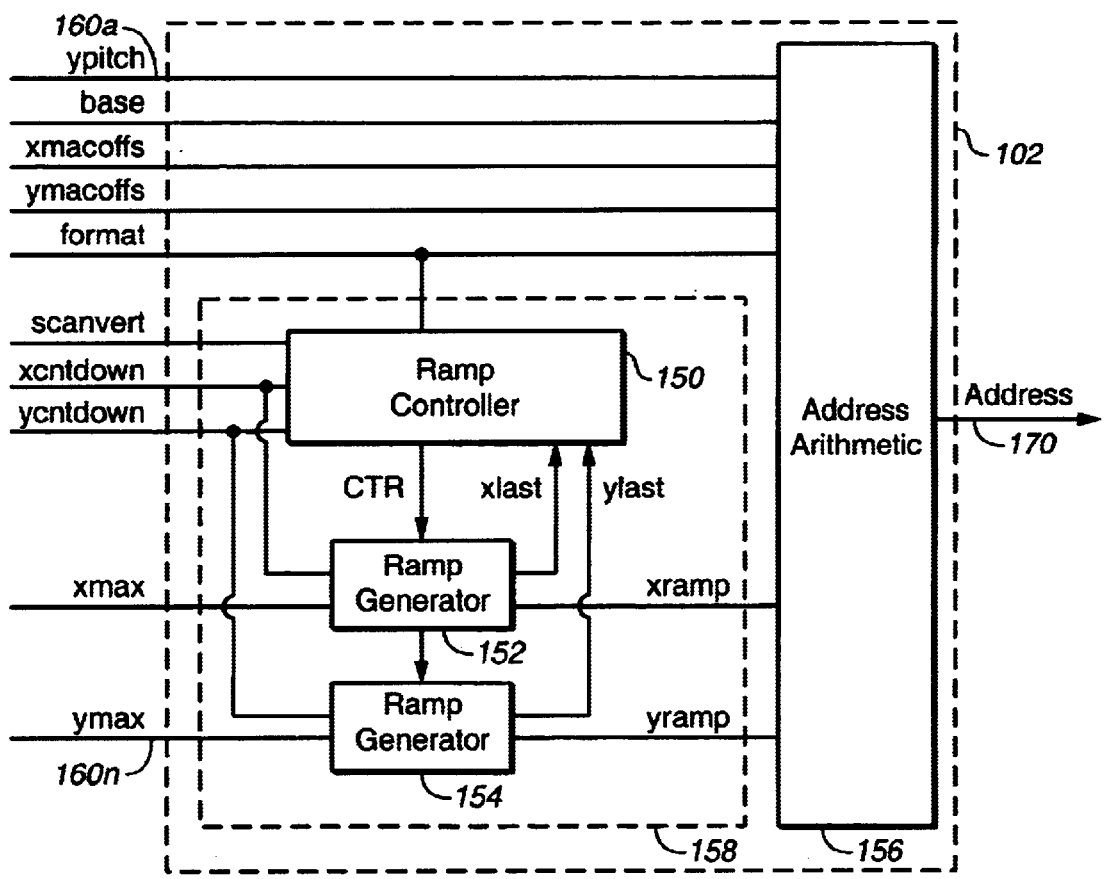
FIG._3
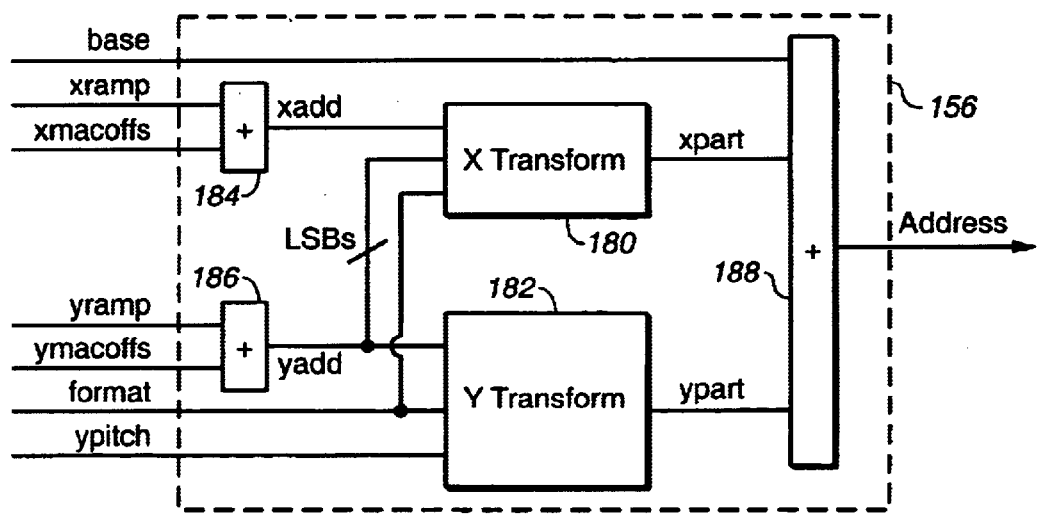
FIG._4

BLOCK MOVE ENGINE WITH MACROBLOCK ADDRESSING MODES

FIELD OF THE INVENTION

The present invention relates to a method and/or architecture for graphics and video generally and, more particularly, to a block move engine with macroblock addressing modes.

BACKGROUND OF THE INVENTION

Conventional video display approaches require data in raster scan order format (i.e., sequential scan lines). In conventional systems, both video and graphics images are usually stored in memory in raster scan order (i.e., complete scan lines of data are stored at sequential locations in memory). Raster scan order is convenient for normal data ordering required to drive a device, such as a display.

Referring to FIG. 1, a system 50 illustrates a BME incorporated within a combined graphics and video system. The system 50 comprises a video capture circuit 52, a graphics CPU 54, a BME 56, a display driver circuit 58, a memory 60 and a system bus 62. The system bus 62 allows the various components of the system 50 to communicate. The video capture block 52 is able to write moving video or individual stills to the system memory 60, while the graphics CPU 54 is responsible for drawing graphics objects from data stored within the system memory 60. The VIDEO INPUT to the video capture block 52 can be a compressed data format. The compressed data is written as decompressed video to the memory 60 in sequential scan lines.

Modern communications (i.e., digital TV, Internet, etc.) often use data compression techniques in order to transfer more data (i.e., images) quickly over a given link. Data compression formats such as JPEG and MPEG use a basic image unit known as a macroblock, which,is typically a square block of 8×8 pixels. It is often convenient when decompressing such data compression formats to store the pixels for each macroblock grouped together in memory rather than storing the image as a whole in raster format. It is therefore conceivable that a system may contain video and data files which are stored in raster format and others in macroblock format.

It would be desirable to implement a BME to allow reading and writing of video or graphics images that are stored in either macroblock format or raster format.

SUMMARY OF THE INVENTION

The present invention concerns an apparatus comprising a first circuit and a second circuit. The first circuit may be configured to generate an address signal in response to (i) a first ramp signal, (ii) a second ramp signal, and (iii) a format signal. The second circuit may be configured to generate the first and second ramp signals in response to one or more control signals. The address signal may support a raster format when the format signal is in a first state and may support a macroblock format when the format signal is in a second state.

The objects, features and advantages of the present invention include providing a method and/or architecture for implementing a block move engine that may (i) implement a number of macroblock addressing modes; (ii) store video data in various macroblock or raster formats that may be read and written in raster scan order; (iii) be suitable for both raster and macroblock format data and/or (iv) implement a base that is an address of (a) a top left pixel in a region being scanned for raster format data or (b) a first data point for a macroblock in a top left of a region being scanned for macroblock format data.

BRIEF DESCRIPTION OF THE DRAWINGS

These and other objects, features and advantages of the present invention will be apparent from the following detailed description and the appended claims and drawings in which:

FIG. 1 is a block diagram of an exemplary implementation of a graphics and video system;

FIG. 2 is a block diagram of a preferred embodiment of the present invention;

FIG. 3 is a block diagram of an address generator of FIG. 2; and

FIG. 4 is a block diagram of an address arithmetic circuit of FIG. 3.

DETAILED DESCRIPTION OF THE PREFERRED EMBODIMENTS

Referring to FIG. 2, a block diagram of a circuit loo is shown in accordance with a preferred embodiment of the present invention. The circuit 100 may be implemented as a block move engine (BME) that may allow reading and writing operations of video or graphics images that are stored in either a raster format or a macrocell format. Specifically, the BME 100 may be capable of allowing, performing, or supporting operations of raster format, macroblock format, or both through a unique addressing scheme. The addressing scheme may support (or allow) operation of raster format data when in one predetermined state and support (or allow) operation of macroblock format data when in another predetermined state. In one example, the BME 100 may be implemented in place of the BME 56 of FIG. 1 to provide increased performance and avoid problems such as those described in the background section. The BME 100 may allow the display driver 58 to read and display any of the video, graphics or BME output objects from the system memory 60. The BME 100 may read graphics or video objects from the memory 60, manipulate and combine (composite) the objects, and write the result back to the memory 60. The system 100 may allow read and write operations for data stored in raster or macroblock formats.

The circuit 100 generally comprises a block (or circuit) 102, a block (or circuit) 104, a block (or circuit) 106 and a block (or circuit) 108. The circuit 102 may be implemented as an address generator block. The circuit 104 may be implemented as a data processing block. The circuit 106 may be implemented as an address generator block. In one example, the circuits 102 and 106 may be implemented as programmable read and write address generators, respectively. The circuit 108 may be implemented as a memory interface. The address generator 102 may present a signal (e.g., ADDRESS1) to the memory interface 108. The address generator 106 may present a signal (e.g., ADDRESS2) to the memory interface 108. Additionally, the data processor 104 may interface with the memory interface 108. The memory interface 108 may interface the system bus 62 and the various other components of FIG. 1 connected to the system bus 62. While the circuit is described as a single input device, more than one input may be accommodated with more than one input. Additional address generators 102 and 106 may be implemented. One input may be raster format while another input may be in macroblock format. Additionally, all inputs could be either raster format or macroblock format, or any combination of the two.

The BME 100 may implement a particular data ordering scheme based on addressing. The BME 100 may operate on rectangular regions of data. The BME 100 may process data in a raster scan order. However, the order of pixel storage in the memory may be raster or macroblock format. The address generator 102 may be required for an input data stream and for the address generator 106 may be required for the output data stream. The programmable read and write address generators 102 and 106 may allow raster or macroblock format video or graphics data stored in the system memory 60 to be scanned horizontally or vertically in a raster pattern (e.g., moving from left or right and top or bottom). Additionally, the programmable read and write generators 102 and 106 may allow video still data to be stored in various macroblock or raster formats to be read and written in raster scan order.

Referring to FIG. 3, a diagram of the address generator circuit 102 (or 106) is shown. The address generator 102 may be similar to the address generator 106. The address generator circuit 102 generally comprises a block (or circuit) 150, a block (or circuit) 152, a block (or circuit) 154 and a block (or circuit) 156. The circuits 150, 152 and 154 may be combined as a single block as shown by the dotted box 158. The circuit 150 may be a ramp controller circuit. The circuit 152 may be implemented as a ramp generator circuit. The circuit 154 may be implemented as a ramp generator circuit. The circuit 156 may be implemented as an address summation circuit. The circuit 156 may provide shifts, multiplication, etc., as needed.

The circuit 102 may have a number of inputs 160a–160n that may receive a number of control signals. The circuit 102 may have an output 170 that may present the signal ADDRESS1. The circuit 154 may present a signal (e.g., YLAST) and a signal (e.g., YRAMP) in response to one of the control signals (e.g., YCNTDOWN and YMAX). The circuit 152 may present a signal (e.g., XLAST) and a signal (e.g., XRAMP) in response to the control signals (e.g., XCNTDOWN and XMAX) and a signal (e.g., CTR) from the ramp controller 150. The signal CTR may be implemented, in one example, as a 4-bit signal or as four individual signals. Two of the signals may be presented to the ramp generator 152 and two may be presented to the ramp generator 154. The signals CTR may initiate a reload and allow counters internal to the ramp generators 152 and 154 to count. The ramp controller 150 may generate the signal CTR in response to the signals FORMAT, SCANVERT, XLAST, YLAST, XCNTDOWN and YCNTDOWN. The summation circuit 156 may generate the signal ADDRESS in response to one or more of the signals XPITCH, BASE, XNACOFFS, XMACOFFS, FORMAT, XRAMP, and YRAMP.

The address generator 102 may be suitable for raster and macroblock format data addressing. The address generator 102 generally comprises the ramp generator 152 and the ramp generator 154 that may count in increments of +/−1 to produce a basic display raster scan pattern of the required number of horizontal and vertical steps in the desired orientation, via the signals XRAMP and YRAMP. The address arithmetic circuit 156 may then convert the values XRAMP and YRAMP to produce the memory address ADDRESS. The various control signals of the present invention may be constant throughout an operation of the BME 100. Additionally, the various control signals may be set by a CPU writing to control registers (not shown).

The ramp generators 152 and 154 may be similar. Additionally, the ramp generators 152 and 154 may be similar within each address generator 102 and 106 (e.g., one for the X direction and another for the Y direction). The X ramp generator 152 and the Y address generator 154 may behave similarly. Therefore, only the X address generator 152 will be described. The operation of the ramp generator 152 may depend on the X scan direction, set by CPU control XCNTDOWN. If XCNTDOWN is 0, the ramp generator 152 may be loaded with 0 and count up to XMAX, whereas if the signal XCNTDOWN is 1, the ramp generator 152 may be loaded with XMAX and count down to 0. The output signal XLAST may become active when the ramp generator 152 reaches the last value of the count (e.g., XMAX if XCNTDOWN is 0, 0 if XCNTDOWN is 1)

The ramp controller 150 may ensure that the ramp generators 152 and 154 operate to produce a raster scan in the correct orientation. If the signal SCANVERT is 0, the X ramp generator 152 may produce a complete ramp for each step in YRAMP, providing a horizontal raster scan. If SCANVERT is 1, a vertical raster scan may be desired, so XRAMP only steps on after the Y ramp generator 154 has produced each complete ramp.

Referring to FIG. 4, a more detailed diagram of the circuit 156 is shown. The circuit 156 generally comprises a circuit 180, a circuit 182, a block 184, a block 186 and a block 188. The circuit 180 may be implemented, as an X transform circuit. The circuit 182 may be implemented as a Y transform circuit. The block 184 may be a summation circuit. The block 186 may be a summation circuit. The block 188 may be a summation circuit.

The block 184 may present a signal (e.g., XADD) in response to the signal XRAMP and the signal XMACOFFS. The block 186 may present a signal (e.g., YADD) in response to the signal YRAMP and the signal YMACOFFS. A circuit 188 may present a signal (e.g., XPART) in response to the signal XADD, the least significant bits (LSBs) of the signal YADD and the signal FORMAT. The circuit 182 may generate a signal (e.g., YPART) in response to the signal YADD, the signal FORMAT and the signal YPITCH. The circuit 188 may generate a signal ADDRESS in response to a signal BASE, the signal XPART and the signal YPART.

The circuit 156 may be implemented as an address arithmetic circuit. The address arithmetic block 156 may calculate the linear address ADDRESS for each memory access from the X and Y ramp values XRAMP and YRAMP. For raster format data, the signal BASE may be the address of the top left pixel in the region being scanned. For macroblock format data, the signal BASE may be the address of the first data point for the macroblock in the top left of the region being scanned, where the data point is not generally part of the region being scanned.

The signals XMACOFFS and YMACOFFS may be the X and Y offset of the top left pixel to be scanned by the BME 100 from the first data point in the macroblock which contains the pixel. The signals XMACOFFS and YMACOFFS may be necessary, since the BME 100 scan may not include the first data point for the top left macroblock (the point normally used as the base for address calculations). The offset values XMACOFFS and YMACOFFS are normally set to 0 for raster format data.

The signal FORMAT may be a control signal to indicate in what format (raster, macroblock, a particular pixel depth, etc.) the data to be operated on by the BME 100 is stored. The signal YPITCH may, be the number of memory words between the start of adjacent horizontal lines of data in raster format. If the data is in macroblock format then the value YPITCH may be the same as if the data were stored in raster format.

Examples of address calculations shown below assume each memory location contains data for one pixel, and that a macroblock may be 8×8 pixels. Calculations for other situations (e.g., number of pixels, size of pixels, etc.) may implement different scalings and/or bit orderings. However, the calculations may be based on similar principles.

The signal XADD may be considered to be an N-bit quantity and the signal YADD may be considered to be an M-bit quantity. The X transform circuit 180 may calculate the XPART of the address using bit shifts and adders.

For raster data:

XPART=XADD[N-1:0]

For macroblock data:

XPART=XADD[N-1:3]*$2^6$+YADD[2:0]*$2^3$+XADD[2:0]

The multiply operations may be achieved by bit shifting. The Y transform 182 circuit may calculate the YPART of the address using bit shifts and a multiplier.

For raster data:

YPART=YADD[M-1:0]*YPITCH

For macroblock data:

YPART=YADD[M-1:3]*$2^3$*YPITCH

The address arithmetic block 156 may require different scale factors and/or bit shuffling operations for other sizes of macroblock, and for pixel data depths which differ from the memory data width.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to generate an address signal in response to (i) a first ramp signal, (ii) a second ramp signal, and (iii) a format signal, wherein said first circuit comprises an address arithmetic circuit configured to receive said first and second ramp signals and generate said address signal; and
   a second circuit configured to generate said first and second ramp signals in response to a one or more control signals;
   a first ramp generator configured to generate said first ramp signal; and
   a second ramp generator configured to generate said second ramp signal, wherein (i) said address signal supports a raster format when said format signal is in a first state and supports a macroblock format when said format signal is in a second state, (ii) said first ramp signal controls horizontal scanning and (iii) said second ramp signal controls vertical scanning.

2. The apparatus according to claim 1, wherein said first circuit is configured to (i) generate a plurality of address signals, and (ii) receive a plurality of format signals, wherein each address signal has a corresponding format signal that is in said first state that supports said raster format and said second state that supports said macroblock format.

3. The apparatus according to claim 1, wherein said apparatus comprises a block move engine with macroblock addressing modes.

4. The apparatus according to claim 1, further comprising:
   a memory configured to store data in one or more data formats.

5. The apparatus according to claim 4, wherein said first circuit is further configured to read from and write to said memory and present video data in raster format.

6. The apparatus according to claim 4, wherein said first circuit is further configured to control writing of data to said memory in one or more raster formats when in said first state or one or more macroblock formats when in said second state.

7. The apparatus according to claim 1, wherein said apparatus is further configured to present video data in raster scan order when (i) said format signal is in said first state providing raster format data and (ii) when said format signal is in said second state providing macroblock format data.

8. The apparatus according to claim 1, wherein said first state comprises a base value comprising an address of a top left pixel in a region being scanned for raster format data or said second state comprises a base value comprising an address of a first data point for a macroblock in a top left of a region being scanned for macroblock format data.

9. The apparatus according to claim 1, where said first circuit further comprises:
   a ramp control circuit configured to control said first and second ramp generators.

10. The apparatus according to claim 9, where said address arithmetic circuit comprises:
    a first transform circuit configured to generate a first part of said address signal;
    a second transform circuit configured to generate a second part of said address signal; and
    a summation circuit configured to generate said address signal, in response to said first and second parts of said address signal.

11. The apparatus according to claim 1, wherein said one or more control signals are selected from the group of (i) a horizontal offset value; (ii) a vertical offset value; (iii) a memory word location value; (iv) a scan direction; (v) a horizontal maximum count value; (vi) a vertical maximum count value; (vi) a horizontal count direction; and (vii) a vertical count direction.

12. An apparatus comprising:
    means for generating an address signal in response to (i) a first ramp signal, (ii) a second ramp signal, and (iii) a format signal, wherein said address signal generating means comprises an address arithmetic circuit configured to receive said first and second ramp signal and generate said address signal; and
    means for generating said first and second ramp signals in response to a one or more control signals;
    a first ramp generator configured to generate said first ramp signal; and
    a second ramp generator configured to generate said second ramp signal, wherein (i) said address signal supports a raster format when said format signal is in a first state and supports a macroblock format when said format signal is in a second state, (ii) said first ramp signal controls horizontal scanning and (iii) said second ramp signals controls vertical scanning.

13. A method for providing a block move engine with macroblock addressing modes, comprising the steps of:
    (A) generating an address signal in response to (i) a first ramp signal, (ii) a second ramp signal, and (iii) a format signal wherein said address signal is generated using an address arithmetic circuit;
    (B) controlling horizontal scanning with said first ramp signal generated by a first ramp generator;

(C) controlling vertical scanning with said second ramp signal generated by a second ramp generator; and (D) generating said first and second ramp signals in response to a one or more control signals, wherein said address signal supports a raster format when said format signal is in a first state and supports a macroblock format when said format signal is in a second state.

14. The method according to claim 13, further comprising:

storing data in one or more data formats within a memory.

15. The method according to claim 14, wherein step (A) further comprises:

presenting video data in raster format.

16. The method according to claim 14, wherein step (A) further comprises:

controlling writing of data to said memory in one or more raster formats when in said first state or controlling writing of data to said memory in one or more macroblock formats when in said second state.

17. The method according to claim 14, further comprising:

presenting video data in raster scan order when (i) said format signal is in said first state providing raster format data and (ii) when said format signal is in said second state providing macroblock format data.

18. The method according to claim 14, wherein said first state comprises a base value comprising an address of a top left pixel in a region being scanned for raster format data or said second state comprises a base value comprising an address of a first data point for a macroblock in a top left of a region being scanned for macroblock format data.

19. The method according to claim 13, where step (A) further comprises:

generating a first part of said address signal;

generating a second part of said address signal; and generating said address signal in response to said first and second parts of said address signal.

* * * * *